United States Patent
Ruutu et al.

(10) Patent No.: US 6,219,713 B1
(45) Date of Patent: Apr. 17, 2001

(54) METHOD AND APPARATUS FOR ADJUSTMENT OF TCP SLIDING WINDOW WITH INFORMATION ABOUT NETWORK CONDITIONS

(75) Inventors: Jussi Ruutu; Kalevi Kilkki, both of Espoo (FI)

(73) Assignee: Nokia Telecommunications, Oy, Espoo (FI)

( * ) Notice: Subject to any disclaimer, the term of this patent is extended or adjusted under 35 U.S.C. 154(b) by 0 days.

(21) Appl. No.: 09/111,205

(22) Filed: Jul. 7, 1998

(51) Int. Cl.[7] .................................................. G06F 13/00

(52) U.S. Cl. .............................................................. 709/235

(58) Field of Search .................................. 370/231, 232, 370/233, 234, 238, 342, 412, 397, 230; 379/6; 709/235, 200, 218, 228, 232, 230; 710/60

(56) References Cited

U.S. PATENT DOCUMENTS

| | | |
|---|---|---|
| 5,042,029 | 8/1991 | Hayakawa .............................. 370/231 |
| 5,410,585 | 4/1995 | Kawaharata ............................. 379/6 |
| 5,546,389 | 8/1996 | Wippenbeck et al. ................ 370/412 |
| 5,592,627 | 1/1997 | Burt et al. ............................. 709/232 |
| 5,708,660 | 1/1998 | Riedel ..................................... 370/397 |
| 5,748,615 | 5/1998 | Riedel et al. ........................ 370/238 |
| 5,768,627 | 6/1998 | Jones et al. ............................. 710/60 |
| 5,805,577 | 9/1998 | Jain et al. ............................. 370/234 |
| 5,805,585 | 9/1998 | Javitt et al. ........................... 370/342 |
| 5,812,527 | 9/1998 | Kline et al. ........................... 370/232 |
| 6,041,039 | * 3/2000 | Kilkiki et al. ........................ 370/230 |

FOREIGN PATENT DOCUMENTS

| | | |
|---|---|---|
| 2 203 617 | 10/1988 | (GB) . |
| WO 97/36410 | 10/1997 | (WO) . |

OTHER PUBLICATIONS

"ATM Lecture", Internet http://syllabus.syr.edu/lst/Mweschen/Ist656/Week4/lecture/atm/atm.htm, pp. 1–5 (Feb. 6, 1997).

"Integrated Services Digital Network (ISDN) Overall Network Aspects and Functions, Traffic Control and Congestion Control in B–ISDN", International Telecommunication Union, ITU–T Recommendation I.371, pp. 1–27 (Mar. 1993).

(List continued on next page.)

*Primary Examiner*—Robert B. Harrell
(74) *Attorney, Agent, or Firm*—Altera Law Group, LLC

(57) ABSTRACT

A method and apparatus for adjustment of TCP sliding window with information about network conditions is disclosed. The present invention obtains information from the network below TCP about the condition of the network and traffic and uses this information to control the transmission of the TCP source without any modifications to the existing TCP sources. The invention includes the steps of receiving feedback information in an acknowledgment packet, receiving a packet having an advertised window field set to an original advertised window size for a sliding window, and modifying the advertised window field to chose the size of the sliding window in response to feedback information received in the acknowledgment packet. The original advertised window size indicates the original size of a sliding window for determining a number of bytes that can be sent before an acknowledgment packet is received. The feedback information further includes a window advertisement. The size of the sliding window includes the minimum of the window advertisement and a congestion window. The window advertisement specifies an increase to the size of the sliding window. The increase includes an additional number of octets of data a receiver is prepared to accept. The method further includes the steps of calculating a modified advertised window size using the window advertisement, comparing the modified advertised window size to an original advertised window size and transmitting an acknowledgment including the least of the modified advertised window size and the original advertised window size.

29 Claims, 4 Drawing Sheets

OTHER PUBLICATIONS

Giroux, N., "Technical Committee, Traffic Management Specification", *ATM Forum*, Version 4.0, af–tm–0056.000, pp. 1–59 (Apr. 1996).

Kessler, G., "An Overview of ATM Technology", ATM Overview, pp. 1–10 (Jan. 1995).

Lambarelli, L., "ATM Service Categories: The Benefits to the User", The ATM Forum: *White Paper on Service Categories*, pp. 1–10 (date unknown).

Symborski, C., "What are the meaning of CBR, VBR, ABR, UBR?", Maintained by Carl Symborski, (Last Changed Aug. 20,1996), pp. 1–2.

Yao, E. "ATM—The New Technology for Tomorrow's B–ISDN", pp. 1–23 (Dec. 1994).

"Congestion Avoidance With BUC (Buffer Utilization Control) Gateways and RFCN (Reverse Feedback Congestion Notification)"; T. Ziegler and H.D. Clausen, *IEEE International Performance Computing and Communications Conference*, Feb. 5–7, 1997, pp. 410–418.

* cited by examiner

METHOD AND APPARATUS FOR ADJUSTMENT OF TCP SLIDING WINDOW WITH INFORMATION ABOUT NETWORK CONDITIONS

BACKGROUND OF THE INVENTION

1. Field of the Invention

This invention relates in general to a networks, and more particularly to method and apparatus for adjustment of TCP sliding window with information about network conditions.

2. Description of Related Art

Today, an organization's computer network has become its circulatory system. Organizations have combined desktop work stations, servers, and hosts into Local Area Network (LAN) communities. These Local Area Networks have been connected to other Local Area Networks and to Wide Area Networks (WANs). It has become a necessity of day-to-day operation that pairs of systems must be able to communicate when they need to, without regard to where they may be located in the network.

During the early years of network computing, proprietary networking protocols were the standard. However, the development of the Open Systems Interconnection Reference Model introduced by the International Organization for Standardization (ISO) has led to an impressive degree of interworking, which generally allows end-user applications to work very well between systems in a network. Implementations are based on written standards that have been made available by volunteers from dozens of computer vendors, hardware component vendors and independent software companies.

During the last decade, LANs have been proliferating. This has created a recurring problem of how to minimize congestion and optimize throughput that must be solved by network managers. An early solution was to simply divide Local Area Networks into multiple smaller networks serving smaller populations. These segments were connected by bridges to form a single Local Area Network with traffic being segregated locally to each segment.

The evolution of new network types and Wide Area Networks created a need for routers. Routers added filtering and firewalling capability to provide more control over broadcast domains, limit broadcast traffic and enhance security. A router is able to chose the best path through the network due to embedded intelligence. This added intelligence also allowed routers to build redundant paths to destinations when possible. Nevertheless, the added complexity of best path selection capability accorded by the embedded intelligence increased the port cost of routers and caused substantial latency overhead. Shared-media networks comprising distributed client/server data traffic, expanded user populations and more complex applications gave birth to new bandwidth bottlenecks. Such congestion produced unpredictable network response times, the inability to support the delay-sensitive applications and higher network failure rates.

An Internet is a set of networks connected by gateways, which are sometimes referred to as routers. The Internet Protocol (IP) is a network layer protocol that routes data across an Internet. The Internet Protocol was designed to accommodate the use of host and routers built by different vendors, encompass a growing variety of growing network types, enable the network to grow without interrupting servers, and support higher-layer of session and message-oriented services. The IP network layer allows integration of Local Area Network "islands".

Transmission Control Protocol (TCP) is a part of the TCP/IP protocol family that has gained the position as one of the world's most important data communication protocols with the success of Internet. To put it short, TCP provides a reliable data connection between devices using TCP/IP protocols. TCP operates on top of IP that is used for packing the data to data packets, called datagrams, and for transmitting across the network.

However, IP doesn't contain any flow control or retransmission mechanisms. That is why TCP is typically used on top of it. Especially, TCP uses acknowledgments for detecting lost data packets.

TCP/IP networks are nowadays probably the most important of all networks, and operate on top of several (physical) networks. These underlying networks may offer some information about the condition of network and traffic. This kind of information is herein referred to as FeedBack (FB) information. This knowledge can be used to better adjust the transmission of the source.

For example, a Simple Integrated Media Access (SIMA) network, as described in co-pending and commonly assigned U.S. patent application Ser. No. 08/821,273, filed Mar. 20, 1997 and entitled "NOMINAL BIT RATE NETWORK SERVICE", which application is hereby incorporated by reference, can provide the source with information about the poorest still acceptable priority level in the network. This system uses priority level feedback as described in co-pending and commonly assigned U.S. patent application Ser. No. 08/821,222, now U.S. Pat. No. 6,041,039 filed Mar. 20, 1997 and entitled "SYSTEM AND METHOD FOR DETERMINING NETWORK BANDWIDTH AVAILABILITY USING PRIORITY LEVEL FEEDBACK", which application is hereby incorporated by reference. Those skilled in the art will recognize that SIMA has also been known as Nominal Bit Rate (NBR) service or Unspecified Bit Rate with Priorities (UBR-P).

The problem arises if PB information is used with an existing TCP source. The most straightforward way seems to be to modify the existing TCP protocol stack and implementation in the source. However, modifying the existing TCP protocol stack and implementation in the source is not always convenient, since the number of different TCP implementations is huge. Furthermore, such a solution is tied with the properties of a certain network under TCP/IP.

It can be seen then that there is a need for a method and apparatus for obtaining information from the network below TCP about the condition of the network and traffic and uses this information to control the transmission of the TCP source.

It can also be seen that there is a need for a method and apparatus for controlling the transmission of the TCP source without any modifications to the existing TCP sources.

SUMMARY OF THE INVENTION

To overcome the limitations in the prior art described above, and to overcome other limitations that will become apparent upon reading and understanding the present specification, the present invention discloses a method and apparatus for adjustment of TCP sliding window with information about network conditions.

The present invention solves the above-described problems by providing a method and apparatus for obtaining information from the network below TCP about the condition of the network and traffic and uses this information to control the transmission of the TCP source without any modifications to the existing TCP sources.

A method in accordance with the principles of the present invention includes the steps of receiving feedback information in an acknowledgment packet, receiving a packet having an advertised window field set to an original advertised window size for a sliding window, and modifying the advertised window field to chose the size of the sliding window in response to feedback information received in the acknowledgment packet.

Other embodiments of a system in accordance with the principles of the invention may include alternative or optional additional aspects. One such aspect of the present invention is that the original advertised window size indicates the original size of a sliding window for determining a number of bytes that can be sent before an acknowledgment packet is received.

Another aspect of the present invention is that the feedback information further includes a window advertisement.

Another aspect of the present invention is that the size of the sliding window includes the minimum of the window advertisement and a congestion window.

Another aspect of the present invention is that the window advertisement specifies an increase to the size of the sliding window.

Another aspect of the present invention is that the increase includes an additional number of octets of data a receiver is prepared to accept.

Another aspect of the present invention is that the method further includes the steps of calculating a modified advertised window size using the window advertisement, comparing the modified advertised window size to an original advertised window size and transmitting an acknowledgment including the least of the modified advertised window size and the original advertised window size.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for obtaining information from the network below TCP about the condition of the network and traffic and uses this information to control the transmission of the TCP source without any modifications to the existing TCP sources.

Figure 1:
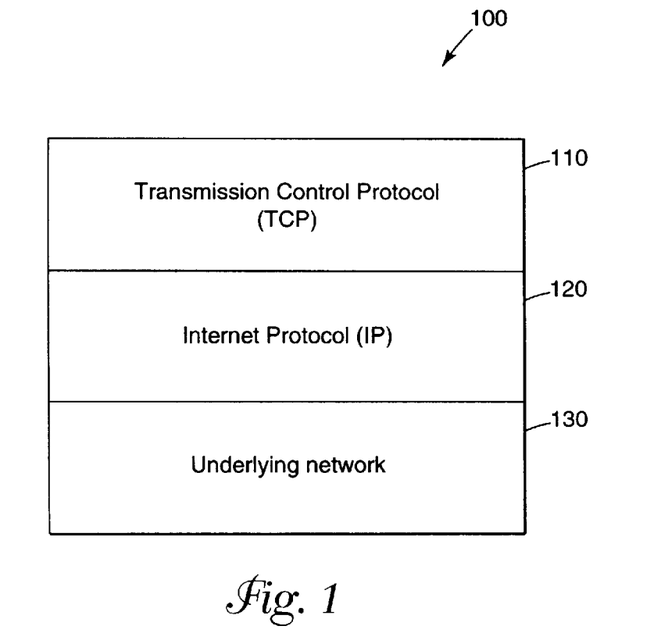
FIG. 1 illustrates a TCP/IP protocol stack.

FIG. 1 illustrates a TCP/IP protocol stack 100. As mentioned above, the TCP layer 110 is a part of the TCP/IP protocol family that has gained the position as one of the world's most important data communication protocols with the success of Internet. The TCP layer 110 provides a reliable data connection between devices using TCP/IP protocols. The TCP layer 110 operates on top of the IP layer 120 that is used for packing the data to data packets, called datagrams, and for transmitting the across the underlying network 130.

However, the IP protocol doesn't contain any flow control or retransmission mechanisms. That is why the TCP layer 110 is typically used on top of the IP layer 120. In contrast, TCP protocols provide acknowledgments for detecting lost data packets.

Figure 2:
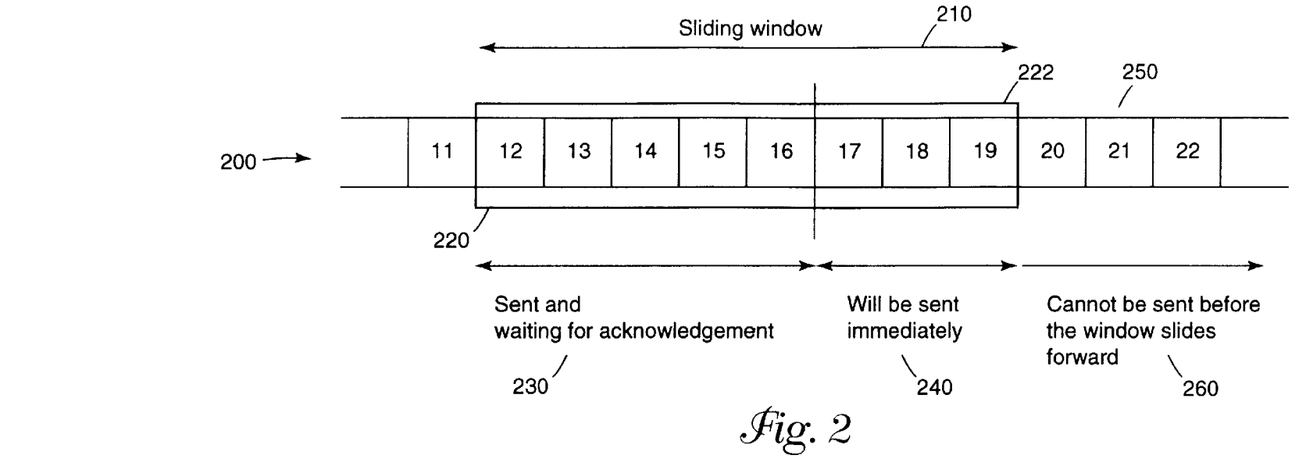
FIG. 2 illustrates a packet stream and a TCP sliding window.

FIG. 2 illustrates a packet stream 200 and a TCP sliding window 210. One of the main features of a TCP source is that it uses a sliding window 210 that determines the bytes and, consequently, the IP packets that can be sent before an acknowledgment is received from the receiver. This makes it possible to adjust the effective transmission rate of the source.

When the TCP source increases the size of the sliding window 210, its average transmission rate increases, too. The sliding window 210 is on top of octets 12–19. Octets up to 11 have been transmitted and the sliding window 210 has moved past them. Inside the sliding window 210, there are two octet groups 220, 222. The first octet group 220 is the octets from 12 to 16, which have been transmitted 230. The second group of octets 222 in the sliding window 210 are octets 17–19, which have not yet been transmitted. The second group of octets 222 can be sent immediately 240. Finally, octets 20 and upwards 250 cannot be transmitted 260. Octet 12 has to be acknowledged and the sliding window slid forward before octet 20 may be transmitted. Thus, TCP provides retransmission of lost data packets and flow control using this TCP sliding window 210. The sliding window 210 is actually the minimum of the congestion window of the window advertisement which is sent by the receiver. A congestion window is maintained by the source as described below.

Figure 3:
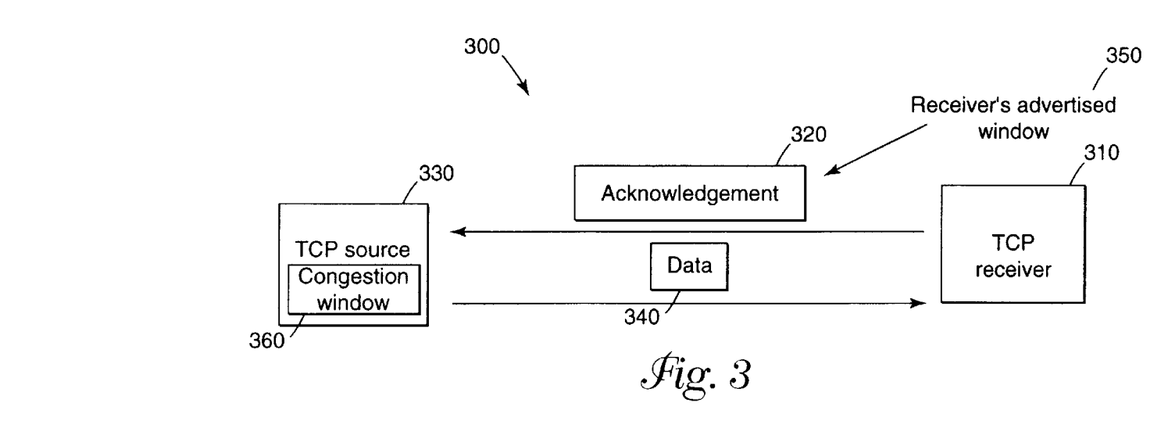
FIG. 3 illustrates a network system wherein a receiver provides acknowledgments to the source as well as receives data from the source.

FIG. 3 illustrates a network system 300 wherein a receiver 310 provides acknowledgments 320 to the source 330 as well as receives data 340 from the source 330. The receiver 310 sends acknowledgment packets 320 that also include window advertisement data 350 for informing the source 330 of the capacity of the receiver 310 to handle incoming data 340. Thus, the receiver 310 can advertise a suitable window size 350 for flow control purposes. In practice, the window advertisement 350 specifies how many additional octets of data the receiver 310 is prepared to accept. The source 330 is supposed to adjust its sliding window according to this advertisement, unless the congestion window 360 maintained by the source 330 is smaller.

The second window, the congestion window 360, is used internally at the TCP source 330 for dropping the size of the sliding window. This occurs if a timer expires telling that a data packet has been sent, but no acknowledgment has arrived within a certain time period. This means that the data packet has been lost which is most probably caused by network congestion. In order not to make the congestion worse, the TCP source 330 drops its transmission rate by reducing the size of the sliding window. The relation of these windows can be expressed as:

$$T_W = \text{MIN}(\text{window advertisement, congestion window}),$$

where $T_W$ refers to the transmission window, i.e., the sliding window.

In principle, the congestion window 360 and feedback information included in the advertisement window 350 provided by the underlying network can be used for the same purpose, namely to adjust the transmission rate of the TCP source 330 according to the load and congestion of the network. However, one important difference between the congestion window 360 and feedback information included in the advertisement window 350 is that the congestion window 360 works on the end-to-end basis and is typically quite slow to react to changes due to relatively long timeouts. Thus, the congestion window 360 can not also give any detailed information. The TCP source 310 simply knows that a packet has been discarded which may not give the exact picture about the network condition. Feedback information included in the advertisement window 350, on the other hand, may be more accurate and may react faster to the changing conditions.

An underlying network can use the receiver's window advertisements 350 carried in acknowledgment packets 320 for controlling the transmission speed of a TCP source 310. This may be accomplished by adding device or network functionality, herein referred to as Feedback Information Converter (FIC).

Figure 4:
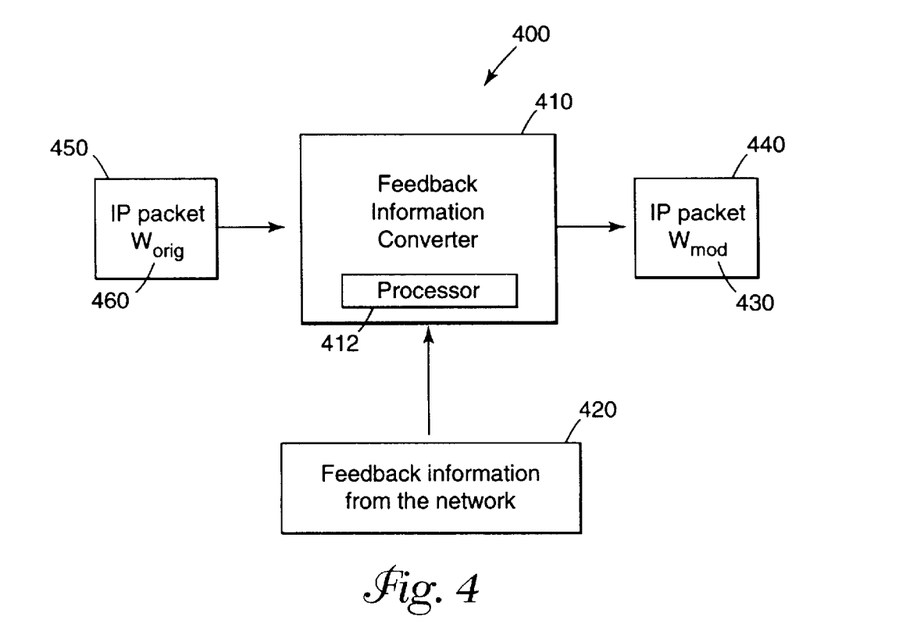
FIG. 4 illustrates the operation of a Feedback Information Converter (FIC) according to the present invention.

FIG. 4 illustrates the operation 400 of a Feedback Information Converter (FIC) 410 according to the present invention. The FIC 410 includes a processor 412. The FIC receives FB information 420 about the condition of the network and traffic and uses this information to create or modify TCP receiver's advertisements 430 carried in acknowledgment packets 440 via the processor 412. The TCP source simply receives, from its point of view, ordinary acknowledgment packets 440 and adjust its transmission window according to the receiver's advertisement 430. The detailed way that the FIC 410 uses the information and determines the "modified" advertised window size depends on the details of the network.

In FIG. 4, an IP packet 450 arrives at the FIC 410 with the advertisement window set to value $W_{orig}$ 460 The FIC 410 also receives some feedback information 420 from the underlying network The feedback information 420 may also be carried by (some) IP packets. Based on the feedback information 420, the FIC 410 will modify the field containing advertised window and place the value $W_{mod}$ 430 in the acknowledgment instead. If the original window size $W_{orig}$ 460 is smaller than the new value $W_{mod}$ 430, then the original value $W_{orig}$ 460 should not be replaced. Finally, the FIC 410 may also produce itself an acknowledgment if no "real" acknowledgment is received.

Figure 5:
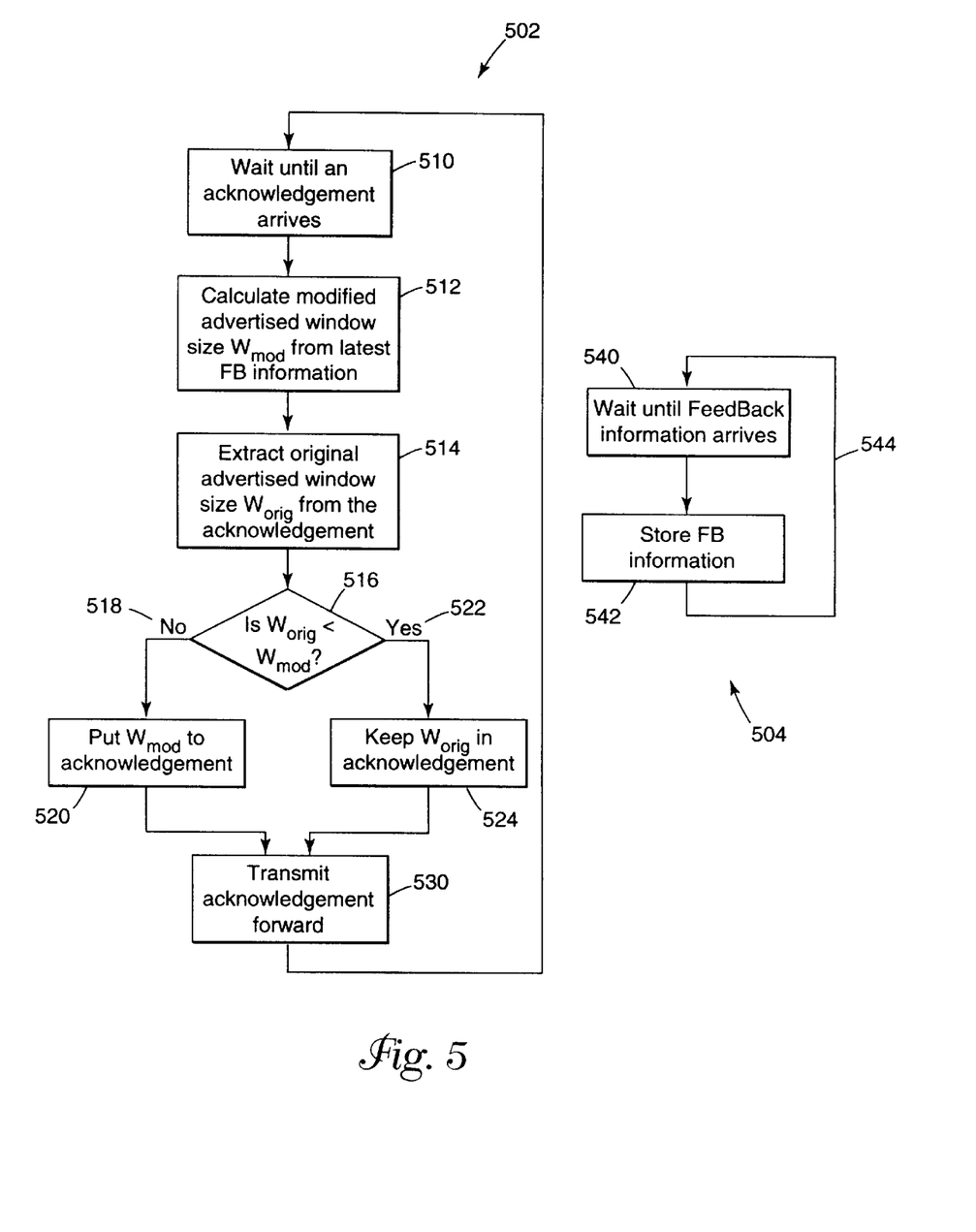
FIG. 5 illustrates a flow chart of one implementation of FIC.

FIG. 5 illustrates a flow chart 500 of one implementation of FIC. Regarding acknowledgment traffic 502, the FIC waits until an acknowledgment arrives 510. Then, the modified advertised window size $W_{mod}$ is calculated using the latest FB information 512. The original advertised window size $W_{orig}$ is extracted from the acknowledgment 514. Next, a determination is made as to whether $W_{orig}$ is less than $W_{mod}$ 516. If not 518, $W_{mod}$ is put in the acknowledgment 520. Otherwise 522, $W_{orig}$ is kept in the acknowledgment 524. Thereafter, the acknowledgment is transmitted forward 530. With respect to FB information 504, the FIC waits until FB information arrives 540. Then, the FB information is stored 542. This loop is repeated 544.

This present invention provides several benefits. First of all, there is no need for touching the existing TCP implementation. Secondly, it is possible to react to changes of the network simply by modifying, feedback information converter. The position of FIC can be either in the source, in the network or in the receiver. For example, FIC can be a part of the access node. The best position for the FIC depends on the structure of the network below TCP. Moreover, the way that network provides feedback information must be taken into account.

Figure 6:
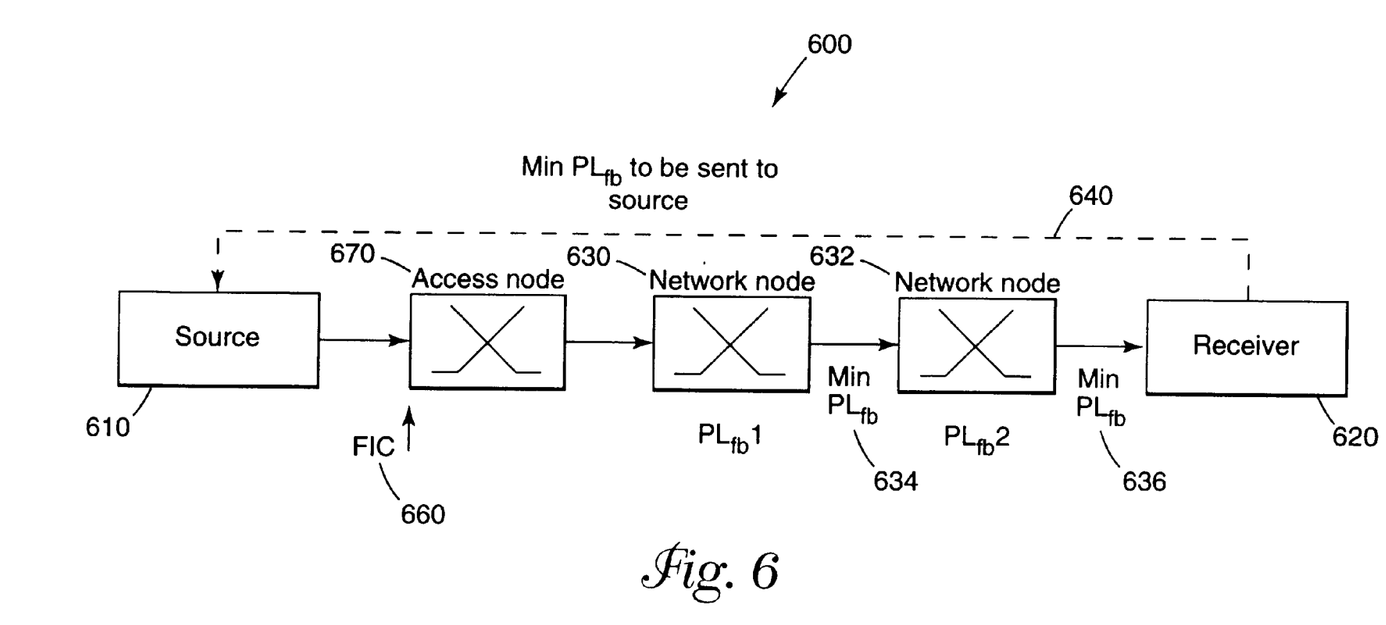
FIG. 6 illustrates an example of a SIMA network having a TCP source and TCP receiver, wherein the transmission of the TCP source is controlled without any modifications to the existing TCP source according to the present invention.

FIG. 6 illustrates an example of a SIMA network 600 having a TCP source 610 and TCP receiver 620, wherein the transmission of the TCP source 610 is controlled without any modifications to the existing TCP source 610 according to the present invention. However, those skilled in the art will recognize that this example is provided for illustration, and that the present example is given without departing from the scope or spirit of the present invention.

SIMA introduces new properties for packet based data networks, such as TCP/IP or ATM networks. SIMA relies on the use of eight packet discarding priority levels, as described in co-pending and commonly assigned U.S. patent application Ser. No. 08/821,273, incorporated by reference earlier herein. Every data packet is equipped with a priority level (PL) that can be an integer between 0 and 7. The priority is determined from the ratio of momentary actual bit rate of the source to the nominal bit rate (NBR) assigned to the source.

At network nodes 630, 632, the priority of a packet is used to determine the packets that may be accepted. According to the SIMA scheme, the network nodes 630, 632 monitor the occupancy level of their buffers. The occupancy levels determine an accepted priority level $PL_a$. If a packet carries a priority that is equal to or greater than $PL_a$, the packet is accepted and placed to the output buffer. Otherwise, the data packet is discarded.

SIMA also provides Priority Level Feedback, which is also described in co-pending and commonly assigned U.S. patent application Ser. No. 08/821,222, incorporated by reference earlier above. Accordingly, a SIMA network can inform the source 610 about a typically accepted priority level in the network 600. Further, there are different ways to determine this information in network nodes 630, 632 as also described in co-pending and commonly assigned U.S. patent application Ser. No. 08/821,222, incorporated by reference earlier above. Simply stated, every network node 630, 632 determines some minimum value, $PL_{fb}$, among recently calculated $PL_a$ values. The source 610 may send a special Resource Management (RM) packet when it needs to know about the condition along the network connection. At every network node 630, 632, the nodes 630, 632 will check the typical value carried in the packet. If the value $PL_{fb}$ calculated in the node is higher indicating a higher priority, then the value carried by RM packet is replaced with this higher value. An RM packet 640, containing the minimum PL to be sent by the source 610, is then send back from the receiver 620 to the source 610. In practice, this means that the source 610 will receive the minimum priority value that it should assign its packets with.

Feedback Information Converter (FIC) 660 will in this case include a function that receives the $PL_{fb}$ information.

When the FIC 660 knows the NBR of the source 610, the FIC 660 can calculate the TCP transmission window size that will keep the priorities of packets just greater than or equal to the $PL_{fb}$ value. Then FIC 660 simply puts this window size to the acknowledgment packets instead of the original receiver's advertisement. If the original window size advertised by the receiver 620 is smaller, then it is not replaced.

Notice that in this case FIC 660 can also be the unit that sends the RM packet 640 in the first place. Thus, normal TCP layers do not have to know anything about SIMA network or Priority Feedback system. One possible position of FIC 660 is as a part of the access node 670. Since the access node 670 maintains the information about the NBR, FIC 660 can calculate a suitable size for the TCP transmission window based on NBR and priority level feedback information. FIC 660 can also be positioned somewhere else in SIMA network 600, provided that the FIC 660 can obtain both NBR and feedback information.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A TCP source in a network comprising a sliding window, the sliding window having a size for determining a number of bytes that can be sent before an acknowledgment packet is received by the TCP source, wherein the size of the sliding window is chosen in response to information received from a TCP receiver in an acknowledgment packet indicating a load condition and traffic congestion for the network.

2. The TCP source of claim 1 wherein the feedback information further comprises a window advertisement.

3. The TCP source of claim 2 wherein the size of the sliding window comprises the minimum of the window advertisement and a congestion window.

4. The TCP source of claim 3 wherein the congestion window being used by the source to indicate a decrease to the size of the sliding window.

5. The TCP source of claim 2 wherein the window advertisement specifies an increase to the size of the sliding window.

6. The TCP source of claim 5 wherein the increase comprises an additional number of octets of data a receiver is prepared to accept.

7. The TCP source of claim 1 wherein the feedback information further comprises a window advertisement, the TCP source calculating a modified advertised window size using the window advertisement and comparing the modified advertised window size to an original advertised window size and transmitting an acknowledgment including the least of the modified advertised window size and the original advertised window size.

8. A feedback information converter, comprising a processor for receiving information from a TCP receiver in an acknowledgment packet indicating a load condition and traffic congestion for the network and a packet having an advertised window field set to an original advertised window size, the original advertised window size indicating the original size of a sliding window for determining a number of bytes that can be sent before an acknowledgment packet is received, the processor modifying the advertised window field to change the size of the sliding window in response to feedback information received in the acknowledgment packet.

9. The feedback information converter of claim 8 wherein the feedback information further comprises a window advertisement.

10. The feedback information converter of claim 9 wherein the size of the sliding window comprises the minimum of the window advertisement and a congestion window.

11. The feedback information converter of claim 10 wherein the congestion window being used by a TCP source to indicate a decrease to the size of the sliding window.

12. The feedback information converter of claim 9 wherein the window advertisement specifies an increase to the size of the sliding window.

13. The feedback information converter of claim 12 wherein the increase comprises an additional number of octets of data a receiver is prepared to accept.

14. The feedback information converter of claim 8 wherein the feedback information further comprises a window advertisement, the processor calculating a modified advertised window size using the window advertisement, comparing the modified advertised window size to an original advertised window size and transmitting an acknowledgment including the least of the modified advertised window size and the original advertised window size.

15. A method for adjusting a size of a sliding window, comprising the steps of:

receiving information from a TCP receiver in an acknowledgment packet indicating a load condition and traffic congestion for the network;

receiving a packet having an advertised window field set to an original advertised window size for a sliding window; and modifying the advertised window field to chose the size of the sliding window in response to feedback information received in the acknowledgment packet.

16. The method of claim 15 wherein the feedback information further comprises a window advertisement.

17. The method of claim 16 wherein the size of the sliding window comprises the minimum of the window advertisement and a congestion window.

18. The method of claim 16 wherein the window advertisement specifies an increase to the size of the sliding window.

19. The method of claim 18 wherein the increase comprises an additional number of octets of data a receiver is prepared to accept.

20. The method of claim 15 wherein the original advertised window size indicates the original size of a sliding window for determining a number of bytes that can be sent before an acknowledgment packet is received.

21. The method of claim 15 wherein the feedback information further comprises a window advertisement, the method further comprising the steps of calculating a modified advertised window size using the window advertisement, comparing the modified advertised window size to an original advertised window size and transmitting an acknowledgment including the least of the modified advertised window size and the original advertised window size.

22. An access node providing a gateway to a network for a source, the access node comprising a feedback information converter, the feedback information converter further comprising a processor for receiving information from a TCP receiver in an acknowledgment packet indicating a load condition and traffic congestion for the network and a packet having an advertised window field set to an original advertised window size, the original advertised window size indicating the original size of a sliding window in a previous node for determining a number of bytes that can be sent before an acknowledgment packet is received, the processor modifying the advertised window field to change the size of the sliding window in response to feedback information received in the acknowledgment packet.

23. The access node of claim 22 wherein the feedback information further comprises a window advertisement.

24. The access node of claim 23 wherein the size of the sliding window comprises the minimum of the window advertisement and a congestion window.

25. The access node of claim 22 wherein the feedback information further comprises a window advertisement, the processor calculating a modified advertised window size using the window advertisement, comparing the modified advertised window size to an original advertised window size and transmitting an acknowledgment including the least of the modified advertised window size and the original advertised window size.

26. A TCP receiver comprising a feedback information converter, the feedback information converter further comprising a processor for receiving information from a subsequent TCP receiver in an acknowledgment packet indicating a load condition and traffic congestion for the network and a packet having an advertised window field set to an original advertised window size, the original advertised window size indicating the original size of a sliding window in a previous node for determining a number of bytes that can be sent before an acknowledgment packet is received, the processor modifying the advertised window field to change the size of the sliding window in response to feedback information received in the acknowledgment packet.

27. The TCP receiver of claim 26 wherein the feedback information further comprises a window advertisement.

28. The TCP receiver of claim 27 wherein the size of the sliding window comprises the minimum of the window advertisement and a congestion window.

29. The TCP receiver of claim 26 wherein the feedback information further comprises a window advertisement, the processor calculating a modified advertised window size using the window advertisement, comparing the modified advertised window size to an original advertised window size in a previous node and transmitting an acknowledgment including the least of the modified advertised window size and the original advertised window size.

* * * * *